(12) United States Patent
Landers et al.

(10) Patent No.: US 8,869,854 B2
(45) Date of Patent: Oct. 28, 2014

(54) TIRE WITH LABEL

(75) Inventors: Samuel Patrick Landers, North Canton, OH (US); Max Harold Dixon, Kent, OH (US); Frank Helmut Bucher, Konz (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 130 days.

(21) Appl. No.: 13/590,668

(22) Filed: Aug. 21, 2012

(65) Prior Publication Data

US 2013/0126063 A1 May 23, 2013

Related U.S. Application Data

(60) Provisional application No. 61/561,987, filed on Nov. 21, 2011.

(51) Int. Cl.
*B60C 13/00* (2006.01)
*B60C 13/02* (2006.01)

(52) U.S. Cl.
USPC .............................. 152/523; 152/524; 152/525

(58) Field of Classification Search
None
See application file for complete search history.

(56) References Cited

U.S. PATENT DOCUMENTS

| | | | |
|---|---|---|---|
| 3,164,192 A | 1/1965 | Kasio et al. | |
| 3,714,993 A * | 2/1973 | Nolley | 173/78 |
| 3,997,217 A * | 12/1976 | Bandet et al. | 301/5.1 |
| 4,684,431 A | 8/1987 | Shurman et al. | |
| 6,080,465 A | 6/2000 | Boissonnet et al. | |
| 7,112,251 B2 | 9/2006 | Majumdar et al. | |
| 7,153,381 B2 | 12/2006 | Majumdar et al. | |
| 7,232,498 B2 | 6/2007 | Zimmer et al. | |
| 7,261,785 B2 | 8/2007 | Pialot | |
| 7,338,914 B2 * | 3/2008 | Conwell et al. | 442/149 |
| 7,387,144 B2 | 6/2008 | Byrne | |
| 2003/0155054 A1 | 8/2003 | Bell | |
| 2006/0290505 A1 | 12/2006 | Conwell et al. | |
| 2008/0047647 A1 | 2/2008 | Raskas | |
| 2009/0229727 A1 | 9/2009 | Losey et al. | |
| 2010/0092716 A1 | 4/2010 | Spychalsky | |
| 2010/0236676 A1 * | 9/2010 | Lans | 152/151 |

FOREIGN PATENT DOCUMENTS

| | | |
|---|---|---|
| EP | 160857 * | 11/1985 |
| EP | 1625952 A1 | 2/2006 |
| EP | 1073031 B1 | 7/2008 |
| EP | 2135750 A1 | 12/2009 |
| EP | 2070677 B1 | 8/2010 |
| JP | 10-260631 * | 9/1998 |
| JP | 2006044503 A | 2/2006 |
| JP | 2008247374 A | 10/2008 |
| KR | 20080010157 A | 10/2008 |
| KR | 100940512 B1 | 2/2010 |
| WO | 2006081197 A2 | 8/2006 |

OTHER PUBLICATIONS

EPO Search Report dated Mar. 14, 2013.

* cited by examiner

*Primary Examiner* — Justin Fischer
(74) *Attorney, Agent, or Firm* — June E. Rickey

(57) ABSTRACT

A pneumatic tire is disclosed having a label affixed to a plurality of whiskers extending from the outer sidewall of the tire. The whiskers may be T shaped. The label may be colored.

4 Claims, 7 Drawing Sheets

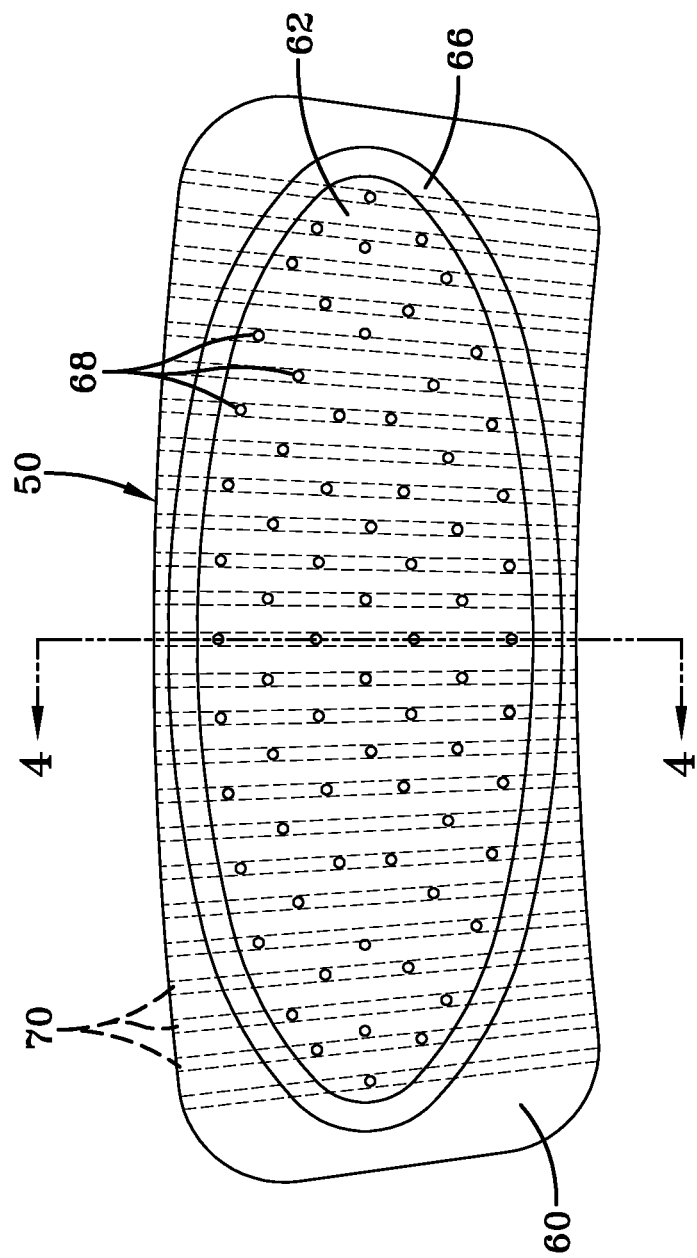

TIRE WITH LABEL

This application claims the benefit of and incorporates by reference U.S. Provisional Application No. 61/561,987, filed Nov. 21, 2011.

FIELD OF THE INVENTION

The invention relates in general to rubber articles and more particularly to tires.

BACKGROUND OF THE INVENTION

Pneumatic tires often desirably have indicial markings commonly known as labels located on the sidewalls of the tire. The tire labels typically include information such as trademarks or other markings. These indicia typically are formed directly into the rubber sidewall during the tire molding process. Thus, the indicia may be raised lettering or other shapes, and may be colored with white pigments or other colorants in the rubber compound. The current trend is to mold the label into the tire sidewall. The label is formed of the black tire sidewall, and is visible to the eye due to the use of different patterns of molded ridges. The letters or other indicia typically have a different angle or pattern of ridges so that a consumer can read the label. See for example, U.S. Pat. No. 5,645,661.

Tires having other types of appliques on the sidewalls thereof, such as lettering, logos, decals, or bar codes and the like, are also very popular. It is known in the prior art to apply stickers or decals to the tire sidewall after the tire has been cured. However, due to the repeated cyclic deformation of the tire sidewall, the decals generally fall off due to inadequate adhesion. Further, if the tires contact a curb, or other surface, the decals will be rubbed or scraped off.

It has also been proposed to replace the previously known sidewall decorative features with appliques which are painted onto conventional black wall tires. However, painting designs on to the sidewall of tires has not proven to be a satisfactory answer to the problem. This is largely due to the fact that designs which are painted on are quite thin and are damaged by the repeated flexing of the sidewalls.

It would, therefore, be desirable to have a tire with indicia applied to a cured tire sidewall surface, wherein the indicial coating material offers good adhesion and durability.

SUMMARY OF THE INVENTION

The present invention provides a pneumatic tire comprising raised indicia on a sidewall of the tire, the raised indicia comprising a plurality of superposed layers of a curable elastomer composition.

BRIEF DESCRIPTION OF THE DRAWINGS

FIG. 3 is a front view of a tire label mold;

DETAILED DESCRIPTION OF THE INVENTION

The present invention relates to a label for a pneumatic tire. The pneumatic tire may comprise any vehicle tire such as a passenger tire; light, medium or heavy truck tires, off-the-road tires, farm tires, mining tires, aircraft tires, motorcycle tires, and the like. The vehicle tire may also be bicycle tires or tires for toy articles. In an alternative embodiment, the label may be used for a rubber article, such as, but not limited to, a door mat, a car mat, and other rubber articles.

Figure 1:
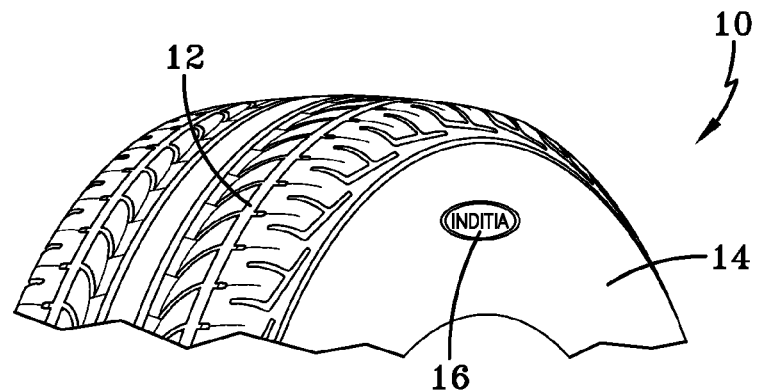
FIG. 1 is a perspective view of a partial section of a sidewall of a tire illustrating an exemplary label.

FIG. 1 illustrates a portion of a tire 10 having a tire tread 12 and a tire sidewall 14. The tire further comprises a tire label 16 mounted on the sidewall. The tire label may have alpha numeric characters and the shape of the label may be in any desired size, shape or color, such as lettering, trademark figures or logos, and the like. The indicia may also be in the shape or pattern of a sidewall stripe or stripes, such as for a white sidewall. Also envisioned as indicia are decorative markings, such as artistic designs, symbols, flowers, dots, short parallel and/or angled stripes or hash marks, or any other shapes as are desired by the user of the tire. The size of the label may be any desired size, and may also include the entire surface of the sidewall of the tire.

Figure 2A:
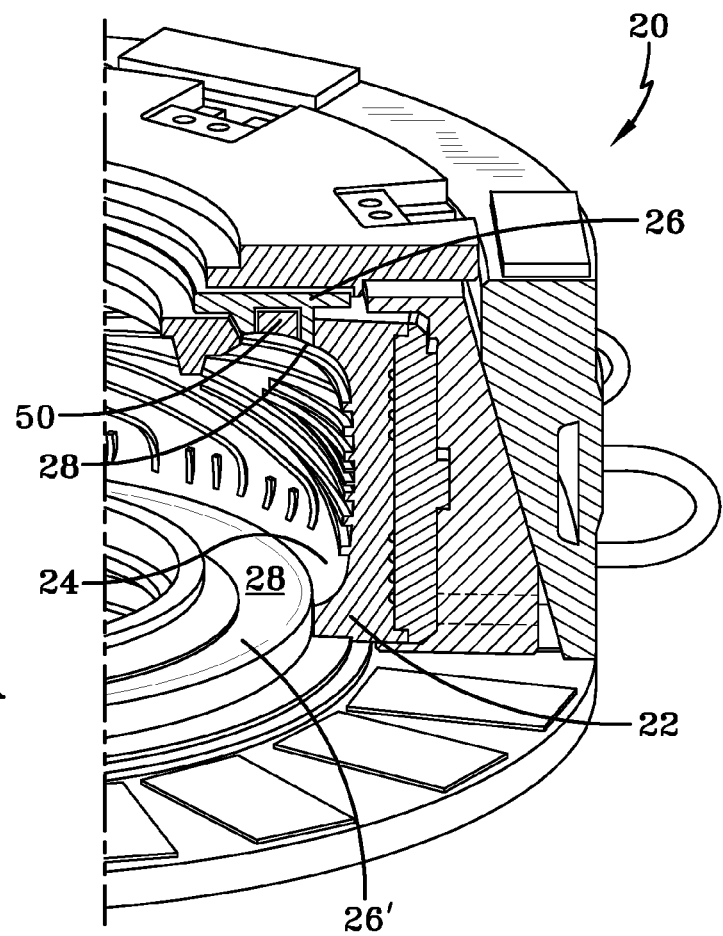
FIG. 2 is a partial view of a tire mold showing the tire label mold mounted in the sidewall forming section of the tire mold.
Figure 2B:
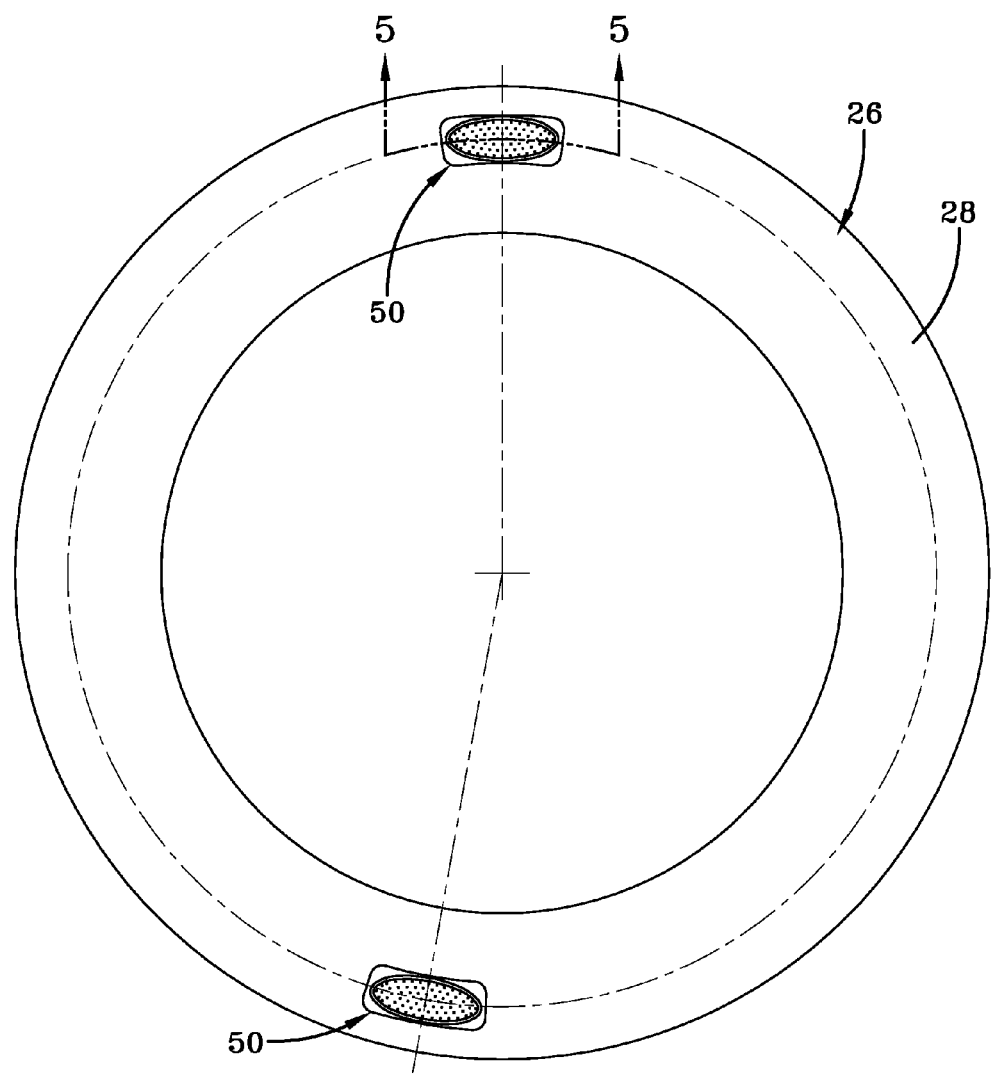

FIG. 2A illustrates a typical mold 20 used for molding a green tire. The mold assembly 20 typically comprises a plurality of segments 22 which are arranged to form an annular ring to encircle the tread of a green tire when the segments are assembled together. The outer tread surface of a tire is formed by the inner molding surface 24 of the segments 22, which have a plurality of lands and grooves to mold the tread pattern into the green tire. The mold segments 22 may be radially movable to allow assembly and disassembly of the mold about a green tire.

The mold assembly 10 further comprises a sidewall plate 26 for molding the sidewalls 14 of the tire. The sidewall plate 26 has an inner mold surface 28,28' for molding the tire sidewall, and joins with the segments to form a smooth continuous surface from the tire tread to the sidewall. The sidewall plate 26 further comprises an inner cavity 30 for receiving a label mold 50, as described in more detail, below.

Figure 6:
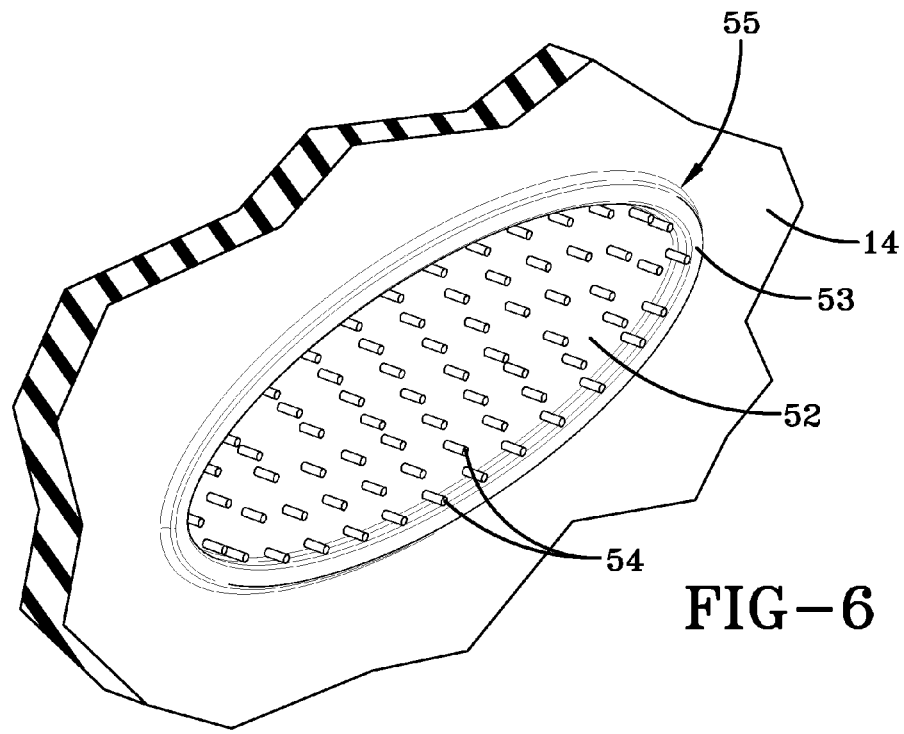
FIG. 6 is a partial view of a cured tire sidewall showing the molded whiskers in the label region.
Figure 8A:
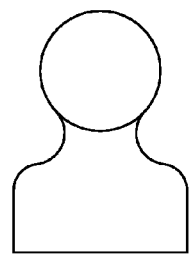
FIGS. 8A-8C illustrate different shapes for the molded whiskers.
Figure 8B:
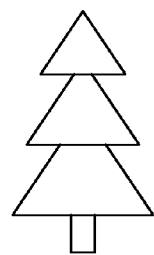
Figure 8C:
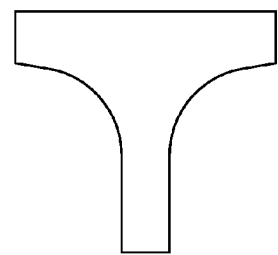

The label mold 50 molds a first surface layer 52 on the sidewall of the tire. The first surface layer 52 is shown in this example to be slightly recessed from the surface of the tire sidewall. An optional raised rim 53 encircles the first surface layer 52 to define the label region 55. The label region 55 further includes a plurality of whiskers 54 which extend from the first surface layer 52. The plurality of whiskers 54 are intentionally formed in the label region on the sidewall surface during the vulcanization of the green tire. The rubber whiskers are formed in a desired pattern. In the example shown in FIG. 6, the whiskers are evenly spaced throughout the label region 55. The whiskers may be any desired shape such as shown in FIG. 6 or as in FIGS. 8a-8c. Preferably, the whiskers have a T shaped configuration as shown in FIG. 8C.

Figure 4:
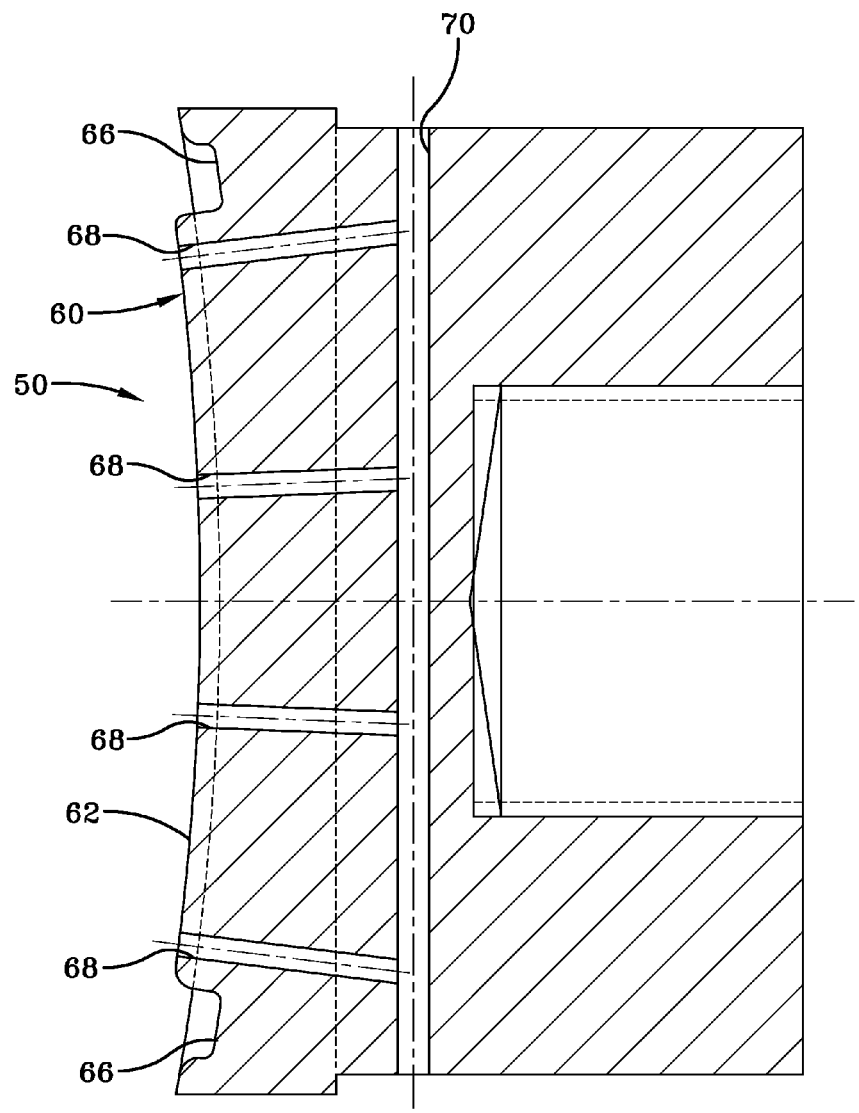
FIG. 4 is a cross-sectional view of the tire label mold in the direction of arrows 4-4 of FIG. 3.
Figure 5:
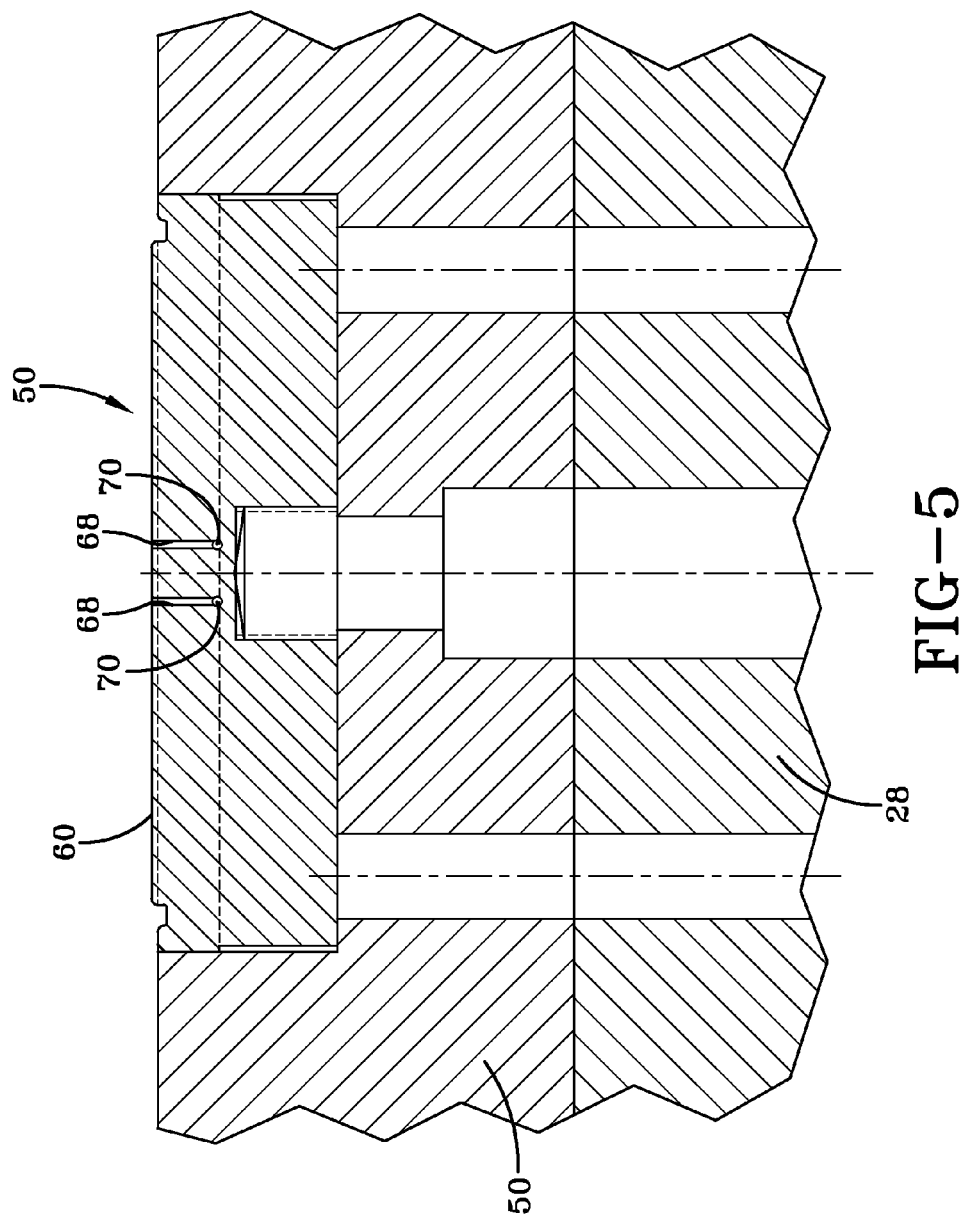
FIG. 5 is a cross-sectional view of the tire label mold in the direction of arrows 5-5 of FIG. 3.

The label mold 50 forms the label region 55 including the first surface layer 52, the whiskers 54 and the optional raised rim 53. The label mold 50 is shown in FIGS. 3-5, and has an outer surface 60 that is to be located adjacent the outer sidewall surface of a green tire. The outer surface further comprises a raised portion 62 that forms the recessed label region 52 on the tire. The raised portion 62 is encircled by an optional channel 66 that forms the raised rim 53 on the green tire. The raised portion 62 further comprises a plurality of holes 68 which are drilled down into the label mold 50 and are connected to a cross channel 70. The holes 68 form the whiskers 57 on the first surface layer 52 of the tire sidewall when the tire is being cured. The holes 68 act as vents to allow the trapped gasses to escape from the mold as the tire is being cured. The green rubber flows into the holes 68 forming the whiskers.

Figure 7:
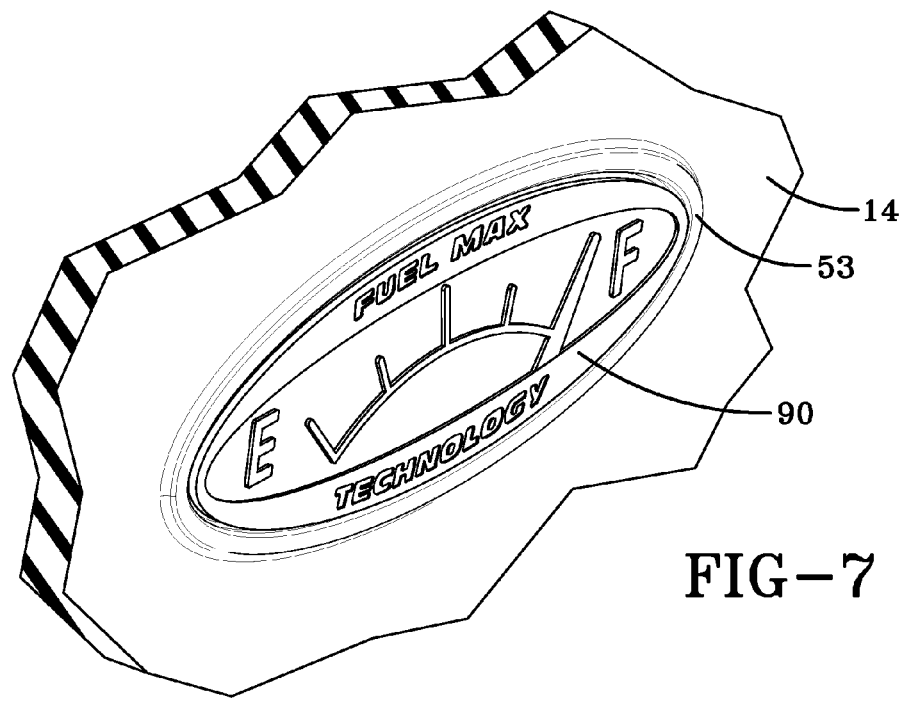
FIG. 7 is a partial view of a cured tire sidewall showing a label mounted on the molded whiskers in the label region.

FIG. 6 illustrates a portion of a tire sidewall that has been cured in the tire mold. The tire sidewall has a recessed first surface layer 52 molded into the tire sidewall with a plurality of whiskers extending from the first surface layer 52. A raised rim 53 encircles the whiskers and the first surface layer 52. FIGS. 8A-8C illustrate different whisker shapes that may be used. FIG. 7 illustrates a decorative label 90 affixed to the whiskers. The decorative label 90 is affixed post cure to the whiskers using a rubber adhesive.

The decorative label 90 may have an outer visible layer 92 formed of a polymer such as a flexible polyvinyl chloride layer (PVC). The outer visible layer is bonded to a rubber or fabric backing. The fabric or rubber backing is affixed to the whiskers post cure using a suitable adhesive. Suitable adhesives include those formed from or based upon cyanoacrylate adhesive, urethane, epoxy, polyvinyl alcohol, acrylate, methacrylate, polyvinyl chloride, polyester and the like.

Figure 9:
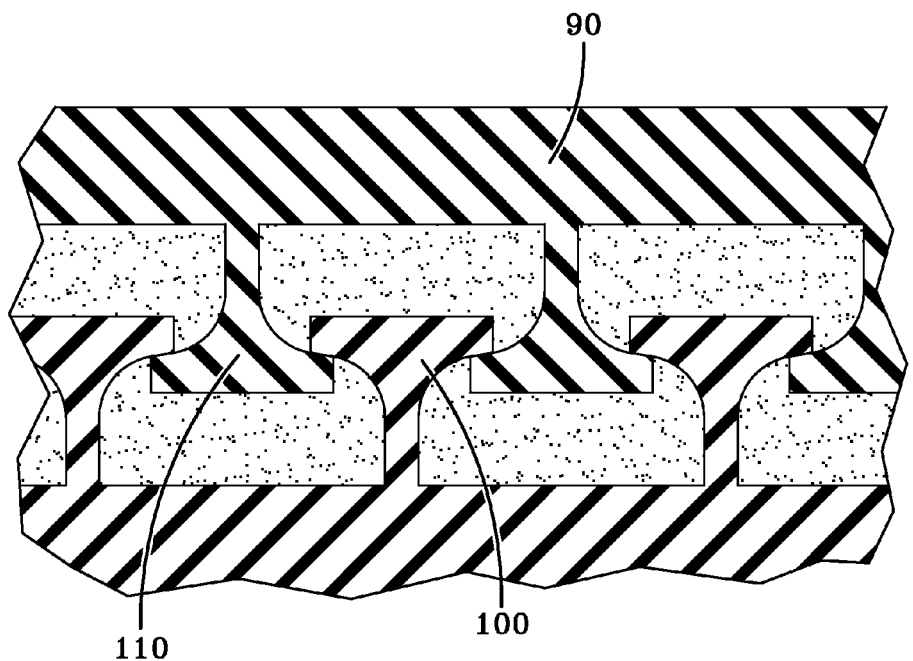
FIG. 9 illustrates a second embodiment of the tire label and tire sidewall.

FIG. 9 illustrates a second embodiment of the present invention. The tire sidewall has a molded portion that includes a plurality of closely spaced whiskers defined in a footprint the same shape as the label to be applied. The whiskers 100 are preferably T shaped. The label 90 preferably has a plurality of T shaped whiskers 110 which are entangled with the whiskers on the tire sidewall to removably secure the label 90 to the tire sidewall. Adhesive may be used to permanently secure the label whiskers to the tire sidewall whiskers.

While present exemplary embodiments of this invention and methods of practicing the same have been illustrated and described, it will be recognized that this invention may be otherwise variously embodied and practiced within the scope of the following claims.

We claim:

1. A pneumatic tire comprising a tread, and a sidewall having a plurality of sidewall whiskers formed in a specified pattern, wherein the sidewall whiskers project from the outer surface of the sidewall, and a label having an upper surface and a lower surface, wherein the lower surface of the label has a plurality of T shaped whiskers which project from said lower surface and which are affixed to the sidewall whiskers with an adhesive.

2. The pneumatic tire of claim 1 wherein the label is formed of polyvinyl chloride.

3. The pneumatic tire of claim 1 wherein the label is colored.

4. The pneumatic tire of claim 1 wherein the tire sidewall has T shaped whiskers.

* * * * *